United States Patent
Ogg et al.

(10) Patent No.: US 11,037,151 B1
(45) Date of Patent: Jun. 15, 2021

(54) SYSTEM AND METHOD FOR DYNAMICALLY PARTITIONING A POSTAGE EVIDENCING SYSTEM

(71) Applicant: Stamps.com Inc., El Segundo, CA (US)

(72) Inventors: Craig Ogg, Long Beach, CA (US); Keith Bussell, Los Angeles, CA (US)

(73) Assignee: Stamps.com Inc., El Segundo, CA (US)

( * ) Notice: Subject to any disclaimer, the term of this patent is extended or adjusted under 35 U.S.C. 154(b) by 997 days.

(21) Appl. No.: 15/603,276

(22) Filed: May 23, 2017

Related U.S. Application Data

(63) Continuation of application No. 12/273,384, filed on Nov. 18, 2008, now abandoned, which is a continuation of application No. 10/643,745, filed on Aug. 19, 2003, now abandoned.

(51) Int. Cl.
  *G06Q 20/40* (2012.01)
  *G06Q 40/00* (2012.01)

(52) U.S. Cl.
  CPC ......... *G06Q 20/4012* (2013.01); *G06Q 40/12* (2013.12); *G06Q 2250/30* (2013.01)

(58) Field of Classification Search
  CPC . G06Q 20/4012; G06Q 40/12; G06Q 2250/30
  See application file for complete search history.

(56) References Cited

U.S. PATENT DOCUMENTS

| | | |
|---|---|---|
| 1,684,756 A | 9/1928 | Close |
| 1,988,908 A | 1/1935 | MacKinnon |
| 2,825,498 A | 3/1958 | Alves |
| 2,887,326 A | 5/1959 | Kramer |
| 3,221,980 A | 12/1965 | Mecur |
| 3,380,648 A | 4/1968 | De Lyra |

(Continued)

FOREIGN PATENT DOCUMENTS

| | | |
|---|---|---|
| EP | 0137737 A2 | 5/1991 |
| EP | 0926632 A2 | 6/1999 |

(Continued)

OTHER PUBLICATIONS

Powell, Edwin, and Campo, John, "Featured product: Mailing machines," Office Solutions, 17.12, Dec. 2000, Quality Publishing Inc., pp. 42-45.*

(Continued)

*Primary Examiner* — Nathan Erb
(74) *Attorney, Agent, or Firm* — Norton Rose Fulbright US LLP

(57) ABSTRACT

A postage evidencing system for tracking postage amounts for multiple users comprising at least two register set partitions is disclosed. Each of the partitions includes an ascending register holding a number representing a value of postage that can be evidenced by the device, a descending register holding a number representing a value of postage that has been previously evidenced by the device, and an identification representing a source of mail pieces that are evidenced with postage from the partition. A security module limits access to the partitions and registers. The identifier for a selected partition is printed on mail pieces as part of an Information Based Indicia (IBI) to identify the source of the mail pieces.

20 Claims, 3 Drawing Sheets

(56) References Cited

U.S. PATENT DOCUMENTS

| | | |
|---|---|---|
| 3,658,239 A | 4/1972 | Foutz |
| 3,747,837 A | 7/1973 | Wilson |
| 3,978,457 A | 8/1976 | Check, Jr. et al. |
| 4,024,380 A | 5/1977 | Gunn |
| 4,245,775 A | 1/1981 | Conn |
| 4,253,158 A | 2/1981 | McFiggans |
| 4,271,481 A | 6/1981 | Check, Jr. et al. |
| 4,306,299 A | 12/1981 | Check, Jr. et al. |
| 4,376,299 A | 3/1983 | Rivest |
| 4,511,793 A | 4/1985 | Racanelli |
| 4,565,317 A | 1/1986 | Kranz |
| 4,629,871 A | 12/1986 | Scribner et al. |
| 4,641,347 A | 2/1987 | Clark et al. |
| 4,649,266 A | 3/1987 | Eckert |
| 4,661,001 A | 4/1987 | Takai et al. |
| 4,709,850 A | 12/1987 | Wagner |
| 4,725,718 A | 2/1988 | Sansone et al. |
| 4,743,747 A | 5/1988 | Fougere et al. |
| 4,757,537 A | 7/1988 | Edelmann et al. |
| 4,760,532 A | 7/1988 | Sansone et al. |
| 4,763,271 A | 8/1988 | Field |
| 4,775,246 A | 10/1988 | Edelmann et al. |
| 4,784,317 A | 11/1988 | Chen et al. |
| 4,800,506 A | 1/1989 | Axelrod et al. |
| 4,802,218 A | 1/1989 | Wright et al. |
| 4,812,994 A | 3/1989 | Taylor et al. |
| 4,821,195 A | 4/1989 | Baer et al. |
| 4,831,554 A | 5/1989 | Storace et al. |
| 4,831,555 A | 5/1989 | Sansone et al. |
| 4,837,701 A | 6/1989 | Sansone et al. |
| 4,853,865 A | 8/1989 | Sansone et al. |
| 4,858,138 A | 8/1989 | Talmadge |
| 4,862,386 A | 8/1989 | Axelrod |
| 4,864,618 A | 9/1989 | Wright et al. |
| 4,868,757 A | 9/1989 | Gil |
| 4,873,645 A | 10/1989 | Hunter et al. |
| 4,900,903 A | 2/1990 | Wright et al. |
| 4,900,904 A | 2/1990 | Wright et al. |
| 4,900,941 A | 2/1990 | Barton et al. |
| 4,901,241 A | 2/1990 | Schneck |
| 4,908,770 A | 3/1990 | Breault et al. |
| 4,910,686 A | 3/1990 | Change et al. |
| 4,919,325 A | 4/1990 | Culver |
| 4,933,849 A | 6/1990 | Connell et al. |
| 4,934,846 A | 6/1990 | Gilham |
| 4,941,091 A | 7/1990 | Breault et al. |
| 4,947,333 A | 8/1990 | Sansone et al. |
| 4,993,752 A | 2/1991 | Juszak |
| 4,998,204 A | 3/1991 | Sansone et al. |
| 5,025,141 A | 6/1991 | Bolan |
| 5,058,008 A | 10/1991 | Schumacher |
| 5,065,000 A | 11/1991 | Pusic |
| 5,079,714 A | 1/1992 | Manduley et al. |
| 5,085,470 A | 2/1992 | Peach et al. |
| 5,091,771 A | 2/1992 | Bolan et al. |
| 5,111,030 A | 5/1992 | Brasington et al. |
| 5,119,306 A | 6/1992 | Metelits et al. |
| 5,136,647 A | 8/1992 | Haber et al. |
| 5,142,482 A | 8/1992 | Sansone |
| 5,150,407 A | 9/1992 | Chan |
| 5,200,903 A | 4/1993 | Gilham et al. |
| 5,202,834 A | 4/1993 | Gilham et al. |
| 5,233,657 A | 8/1993 | Gunther et al. |
| 5,237,506 A | 8/1993 | Horbal et al. |
| 5,239,168 A | 8/1993 | Dursty, Jr. et al. |
| 5,280,531 A | 1/1994 | Hunter |
| 5,289,540 A | 2/1994 | Jones |
| 5,316,208 A | 5/1994 | Petkovsek |
| 5,319,562 A | 6/1994 | Whitehouse |
| 5,323,323 A | 6/1994 | Gilham et al. |
| 5,323,465 A | 6/1994 | Avarne |
| 5,341,505 A | 8/1994 | Whitehouse |
| 5,375,172 A | 12/1994 | Chrosny |
| 5,388,049 A | 2/1995 | Sansone et al. |
| 5,423,573 A | 6/1995 | de Passille |
| 5,437,441 A | 8/1995 | Tuhro et al. |
| 5,439,721 A | 8/1995 | Pedroli et al. |
| 5,454,038 A | 9/1995 | Cordery et al. |
| 5,468,945 A | 11/1995 | Huggett et al. |
| 5,471,925 A | 12/1995 | Heinrich et al. |
| 5,476,420 A | 12/1995 | Manning |
| 5,490,077 A | 2/1996 | Freytag |
| 5,501,393 A | 3/1996 | Walz |
| 5,510,992 A | 4/1996 | Kara |
| 5,573,277 A | 11/1996 | Petkovsek |
| 5,583,779 A | 12/1996 | Naclerio et al. |
| 5,592,666 A | 1/1997 | Perez |
| 5,598,970 A | 2/1997 | Mudry et al. |
| 5,600,562 A | 2/1997 | Guenther |
| 5,602,743 A | 2/1997 | Fraytag |
| 5,606,507 A | 2/1997 | Kara |
| 5,606,508 A | 2/1997 | Thiel |
| 5,606,613 A | 2/1997 | Lee et al. |
| 5,615,123 A | 3/1997 | Davidson et al. |
| 5,615,312 A | 3/1997 | Kohler |
| 5,617,519 A | 4/1997 | Herbert |
| 5,619,571 A | 4/1997 | Sandstrom et al. |
| 5,623,546 A | 4/1997 | Hardy et al. |
| 5,649,118 A | 7/1997 | Carlisle et al. |
| 5,650,934 A | 7/1997 | Manduley |
| 5,655,023 A | 8/1997 | Cordery et al. |
| 5,666,284 A | 9/1997 | Kara |
| 5,675,650 A | 10/1997 | Cordery et al. |
| 5,696,829 A | 12/1997 | Cordery et al. |
| 5,699,258 A | 12/1997 | Thiel |
| 5,706,502 A | 1/1998 | Foley et al. |
| 5,715,164 A | 2/1998 | Liechti et al. |
| 5,715,314 A | 2/1998 | Payne et al. |
| 5,717,596 A | 2/1998 | Bernard et al. |
| 5,717,597 A | 2/1998 | Kara |
| 5,726,897 A | 3/1998 | Tammi et al. |
| 5,742,683 A | 4/1998 | Lee et al. |
| 5,745,887 A | 4/1998 | Gargiulo et al. |
| 5,774,554 A * | 6/1998 | Gilham ............ G07B 17/00508 380/51 |
| 5,774,886 A | 6/1998 | Kara |
| 5,778,076 A | 7/1998 | Kara et al. |
| 5,791,553 A | 8/1998 | Fabel |
| 5,796,834 A | 8/1998 | Whitney et al. |
| 5,799,290 A | 8/1998 | Dolan et al. |
| 5,801,364 A | 9/1998 | Kara et al. |
| 5,801,944 A | 9/1998 | Kara |
| 5,805,810 A | 9/1998 | Maxwell |
| 5,812,991 A | 9/1998 | Kara |
| 5,819,240 A | 10/1998 | Kara |
| 5,822,739 A | 10/1998 | Kara |
| 5,825,893 A | 10/1998 | Kara |
| 5,860,068 A | 1/1999 | Cook |
| 5,884,277 A | 3/1999 | Khosla |
| 5,902,439 A | 5/1999 | Pike et al. |
| 5,912,682 A | 6/1999 | Parkos |
| 5,923,406 A | 7/1999 | Brasington et al. |
| 5,923,885 A | 7/1999 | Johnson et al. |
| 5,929,415 A | 7/1999 | Berson |
| 5,930,796 A | 7/1999 | Pierce et al. |
| 5,946,671 A | 8/1999 | Herring et al. |
| 5,983,209 A | 11/1999 | Kara |
| 6,005,945 A | 12/1999 | Whitehouse |
| 6,010,156 A | 1/2000 | Block |
| 6,026,385 A * | 2/2000 | Harvey ............ G07B 17/00024 705/401 |
| 6,061,670 A | 5/2000 | Brand |
| 6,073,125 A | 6/2000 | Cordery et al. |
| 6,079,327 A | 6/2000 | Sarada |
| 6,098,057 A | 8/2000 | Dlugos |
| D434,438 S | 11/2000 | Kara |
| 6,155,476 A | 12/2000 | Fabel |
| 6,173,888 B1 | 1/2001 | Fabel |
| 6,202,057 B1 * | 3/2001 | Pierce ................ G07B 17/0008 705/408 |
| 6,208,980 B1 | 3/2001 | Kara |
| 6,209,779 B1 | 4/2001 | Fabel |
| 6,233,565 B1 | 5/2001 | Lewis et al. |
| 6,442,525 B1 | 8/2002 | Silverbrook et al. |

(56) References Cited

U.S. PATENT DOCUMENTS

| | | |
|---|---|---|
| 6,470,327 B1 | 10/2002 | Carroll et al. |
| 6,721,717 B2 | 4/2004 | Kramer |
| 6,820,065 B1 * | 11/2004 | Naclerio ............ G07B 17/0008 |
| | | 705/30 |
| 6,865,561 B1 | 3/2005 | Allport et al. |
| 6,939,062 B2 | 9/2005 | Ogg et al. |
| 7,043,053 B1 | 5/2006 | Patton et al. |
| 7,056,410 B2 | 6/2006 | Kuller et al. |
| 7,069,253 B2 * | 6/2006 | Leon ............... G07B 17/00024 |
| | | 705/408 |
| 7,127,434 B2 | 10/2006 | Burningham |
| 7,249,050 B1 | 7/2007 | Walker et al. |
| 7,433,849 B2 | 10/2008 | Cordery et al. |
| 7,774,284 B2 | 8/2010 | Williams et al. |
| 8,000,988 B1 | 8/2011 | Bezanson et al. |
| 8,078,293 B2 | 12/2011 | Campagna et al. |
| 8,150,781 B2 | 4/2012 | McCall et al. |
| 8,195,579 B2 | 6/2012 | Kara |
| 8,250,000 B2 | 8/2012 | Ogg |
| 8,412,641 B2 | 4/2013 | Zeisset et al. |
| 8,630,912 B2 | 1/2014 | Seki et al. |
| 2001/0007086 A1 | 7/2001 | Rogers et al. |
| 2001/0016487 A1 | 8/2001 | Hiatt, Jr. |
| 2001/0032278 A1 | 10/2001 | Brown et al. |
| 2001/0037320 A1 | 11/2001 | Allport et al. |
| 2002/0026430 A1 | 2/2002 | Ryan |
| 2002/0032668 A1 | 3/2002 | Kohler et al. |
| 2002/0040353 A1 | 4/2002 | Brown et al. |
| 2002/0046182 A1 | 4/2002 | Bator et al. |
| 2002/0073052 A1 | 6/2002 | Katikaneni et al. |
| 2002/0143714 A1 | 10/2002 | Allport et al. |
| 2002/0152127 A1 | 10/2002 | Hamilton et al. |
| 2003/0004824 A1 * | 1/2003 | Joshi .................... G06Q 30/02 |
| | | 358/1.15 |
| 2003/0004900 A1 | 1/2003 | Schwartz et al. |
| 2003/0014376 A1 | 1/2003 | DeWitt et al. |
| 2003/0074324 A1 | 4/2003 | Kresina et al. |
| 2003/0140017 A1 | 7/2003 | Patton et al. |
| 2003/0144972 A1 | 7/2003 | Cordery et al. |
| 2003/0193530 A1 | 10/2003 | Blackman et al. |
| 2004/0083189 A1 | 4/2004 | Leon |
| 2004/0089711 A1 | 5/2004 | Sandru |
| 2004/0098354 A1 | 5/2004 | Manduley |
| 2004/0122776 A1 | 6/2004 | Sansone |
| 2004/0122777 A1 | 6/2004 | Sansone |
| 2004/0122779 A1 | 6/2004 | Stickler et al. |
| 2004/0133438 A1 | 7/2004 | Zeisset et al. |
| 2004/0194154 A1 | 9/2004 | Meadors et al. |
| 2004/0220695 A1 * | 11/2004 | Pintsov ................. G06Q 10/10 |
| | | 700/224 |
| 2004/0243523 A1 | 12/2004 | Herbert |
| 2004/0258089 A1 | 12/2004 | Derechin et al. |
| 2004/0267676 A1 | 12/2004 | Feng et al. |
| 2005/0075991 A1 | 4/2005 | Ogg |
| 2005/0080751 A1 | 4/2005 | Burningham |
| 2005/0137991 A1 | 6/2005 | Bruce et al. |
| 2005/0192912 A1 | 9/2005 | Bator et al. |
| 2005/0256811 A1 | 11/2005 | Pagel et al. |
| 2007/0011023 A1 | 1/2007 | Silverbrook |
| 2007/0043839 A1 | 2/2007 | Amadio et al. |
| 2007/0174213 A1 | 7/2007 | Whitehouse et al. |
| 2007/0233754 A1 | 10/2007 | Baeuerle et al. |
| 2008/0178162 A1 | 7/2008 | Sanford et al. |
| 2008/0228669 A1 | 9/2008 | Harris et al. |
| 2008/0298568 A1 | 12/2008 | Karandikar |
| 2009/0144230 A1 | 6/2009 | Fant |
| 2009/0241030 A1 | 9/2009 | von Eicken et al. |
| 2009/0319395 A1 | 12/2009 | Chandaria |
| 2010/0269030 A1 | 10/2010 | Dugonjic et al. |
| 2010/0299205 A1 | 11/2010 | Erdmann et al. |
| 2011/0071954 A1 | 3/2011 | McCall et al. |

FOREIGN PATENT DOCUMENTS

| | | |
|---|---|---|
| EP | 0927963 A2 | 7/1999 |
| FR | 2580844 A1 | 10/1986 |
| GB | 2251210 A | 7/1992 |
| JP | 05-132049 | 5/1993 |
| JP | 09-508220 | 8/1997 |
| JP | 02000105845 A | 4/2000 |
| JP | 04284558 B2 | 6/2009 |
| WO | WO-88/01818 A1 | 3/1988 |
| WO | WO-1995/19016 A2 | 7/1995 |
| WO | WO-98/14907 A2 | 4/1998 |
| WO | WO-98/14909 A2 | 4/1998 |
| WO | WO-98/57302 A1 | 12/1998 |
| WO | WO-98/57460 A1 | 12/1998 |
| WO | 0927958 A2 | 7/1999 |

OTHER PUBLICATIONS

"Information-Based Indicia Program (IBIP): Performance Criteria for Information-Based Indicia and Security Architecture for Open IBI Postage Evidencing Systems," Feb. 23, 2000, The United States Postal Service (USPS), 79 pages.

Davis Brad L.; "Printing System for Preventing Injustice by Delivering Print Data from Postal Charge Meter to Printer," Jan. 2001.

Office Action dated Mar. 13, 2007 for JP 515,253/97; with English language translation (4 pages).

Minnick, Robert, "Postage Imprinting Apparatus and Methods for Use With a Computer Printer", Apr. 27, 1995, 71 pages.

Office Action issued for Japanese Patent Application No. 515,253/1997, dated Apr. 21, 2009; 5 pages (with English language translation).

"Service contracts: profit center or necessary evil. (heating and air conditioning maintenance contracts)", Whitaker, Bert, Air Conditioning, Heating & Refrigeration News, v192, n3, p22(2).

Unpublished U.S. Appl. No. 10/606,579 to Ogg, filed Jun. 26, 2003 and entitled "System and Method for Automatically Processing Mail.".

Avery, S., "With New Postage Meters Buyers Can Stamp Out Costs," Purchasing, 132, 11 Jul. 17, 2003, 2 pages.

* cited by examiner

SYSTEM AND METHOD FOR DYNAMICALLY PARTITIONING A POSTAGE EVIDENCING SYSTEM

CROSS-REFERENCE TO RELATED APPLICATIONS

The present application is a continuation of co-pending, commonly assigned, patent application Ser. No. 12/273,384 entitled "SYSTEM AND METHOD FOR DYNAMICALLY PARTITIONING A POSTAGE EVIDENCING SYSTEM," filed Nov. 18, 2008, which is a continuation of co-pending, commonly assigned, patent application Ser. No. 10/643,745 entitled "SYSTEM AND METHOD FOR DYNAMICALLY PARTITIONING A POSTAGE EVIDENCING SYSTEM," filed Aug. 19, 2003, and is related to co-pending and commonly assigned U.S. patent application Ser. No. 10/606,579 entitled "SYSTEM AND METHOD FOR AUTOMATICALLY PROCESSING MAIL" filed Jun. 26, 2003, the disclosures of which are incorporated herein by reference in their entirety.

TECHNICAL FIELD

The present invention relates generally to printing postage indicia on mail pieces and, more particularly, to a partitioned postage evidencing device that can track postage amounts for multiple users.

BACKGROUND OF THE INVENTION

A postage metering device is a device that can apply indicia of postage amounts to a mail piece, such as an envelope. The indicia serve as proof of postage to the Postal Service. A postage metering device has a set of registers, known as the ascending register and the descending register, that track the postage that has been applied by that meter. When money or value is added to the metering device, it increases the descending register; and when postage is applied or evidenced, an amount of money equal to the postage value is transferred from the descending register to the ascending register. Accordingly, as the descending register decreases, the ascending register increases.

Typical metering devices have a single set of registers, and all of the postage evidenced by a particular meter is tracked by the single set of registers. In environments where a service bureau, such as a letter shop or presort house, provides postage printing to clients, the service bureau owns the meter and is responsible for paying to add postage to the meter. The service bureau prints the postage for clients and is later reimbursed by the clients for the cost of the postage.

One of the issues in the use of a service bureau to process mail in this fashion for a third party client, is that the Postal Service cannot determine who is actually sending the mail. This is because the postage evidence on the envelope is associated with the service bureau, not the sender. Accordingly, the postage identifies the service bureau rather than the person or company that actually mailed the piece.

This creates a problem for the Postal Service in that they cannot identify the actual mailer. Therefore, this mail piece is essentially anonymous to them. This is an issue due to concerns regarding hazardous materials that may need separate treatment in the mail. The Postal Service envisions a system in the future where anonymous mail will go along a slower mail track that will include further checks and decontamination for the mail piece, whereas identified mail will move along a faster path. Approximately 80% of the main mail stream comes from high-speed service bureau environments that would be considered to be anonymous. This would mean that most of the mail stream would have to unnecessarily travel along the slower path.

BRIEF SUMMARY OF THE INVENTION

The present invention is directed to a system and method that allows multiple sets of registers to be used within a single postage evidencing meter or device. A service bureau or user can then associate different sets of registers with different identities or customers. Accordingly, it is possible to use postage applied by a single device to specifically identify several mailers. As a result, the service bureau or user would not require separate pieces of hardware for each mailer.

A postage evidencing device according to embodiments of the present invention can be dynamically partitioned into more than one postage evidencing device. Each device having its own set of registers, and each set of registers being separately registered with the Postal Service. Each set of registers has its own unique identifier, which is printed on the mail piece, and each set of registers has a unique access control to access the device, but all the sets of registers share the same print mechanism.

This allows service bureau customers to track and control how much money is in their set of registers for their mailing. In this manner, customers can control the postage charges. Additionally, the nature of the financial relationship regarding the meter can also be changed such that the actual mailer can put the postage on deposit with the Postal Service rather than requiring the service bureau to carry that financial burden.

Embodiments of the invention include a postage evidencing system for tracking postage amounts for multiple users comprising at least two register set partitions, each of the partitions including a descending register holding a number representing a value of postage that can be evidenced by the device, an ascending register holding a number representing a value of postage that has been previously evidenced by the device, and an identification representing a source of mail pieces that are evidenced with postage from the partition; and a security module that limits access to the partitions and registers.

The postage evidencing system also includes a printer for evidencing postage on mail pieces. The printer and register partitions are incorporated in separate devices, in one embodiment, and are part of the same device, in another embodiment of the invention. Users interact with the system via a display and keypad that provide a user interface to the partitions.

In another embodiment of the invention, a method is disclosed for evidencing postage using a postage evidencing device that tracks postage amounts for multiple users using register set partitions. Each partition includes a descending register representing a value of postage that can be evidenced by the device, an ascending register representing a value of postage that has been previously evidenced by the device, and an identification representing a source of mail pieces that are evidenced with postage from the partition. The method includes identifying existing register set partitions, receiving a partition selection from a user, determining an amount of postage to be evidenced on a mail piece by the device, comparing the amount of postage to be evidenced to the descending register to determine if the selected partition has sufficient postage, and printing postage on the mail piece.

The method also determines whether the postage evidencing device includes existing partitions and, if the postage evidencing device does not include partitions, creates a first partition on the postage evidencing device. Users can also create additional partitions and can select a postage amount that is added to the new partition. Preferably, the partitions are protected and a password or PIN must be entered to modify the registers. When a user purchases additional postage, the descending register is increased by an amount equivalent to an amount of postage purchased.

The value of postage that is printed or evidenced on the mail pieces may be calculated by the postage evidencing device or may be received from another device. In preferred embodiments, the postage is printed on the mail pieces as Information Based Indicia (IBI).

In another embodiment of the invention, a system for bulk processing of mail pieces associated with different sources includes a controller for controlling the operation of components in the system and for tracking the location of mail pieces in the system, a postage evidencing device that tracks postage amounts for multiple users using register set partitions, and a postage application printer for evidencing postage on the mail pieces. Each of the partitions includes a descending register representing a value of postage that can be evidenced by the device, an ascending register representing a value of postage that has been previously evidenced by the device, and an identification representing a source of mail pieces that are evidenced with postage from the partition.

The controller identifies a source of a particular group of mail pieces to the postage evidencing device, and the postage evidencing device selects a partition associated with the source to use when applying postage to that group of mail pieces. The group of mail pieces may be a single mail piece or a plurality of mail pieces. The group of mail pieces may have varying weights, thereby requiring varying postage amounts for each mail piece. In a preferred embodiment, the postage is evidenced on mail pieces as Information Based Indicia (IBI) that includes the identification of a selected partition.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
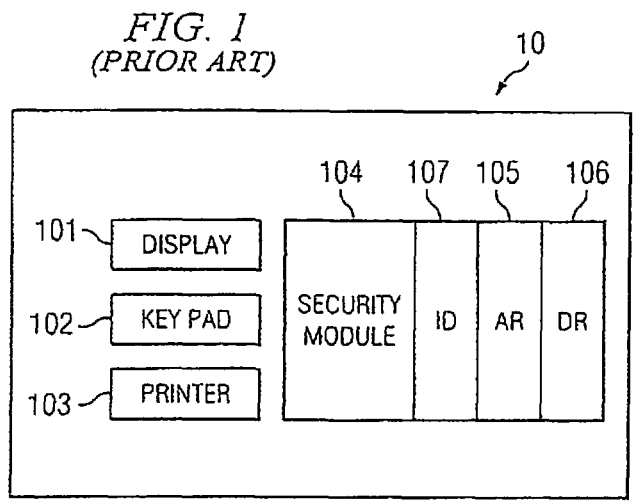
FIG. 1 is a block diagram of a prior art postage evidencing device.

FIG. 1 is a block diagram of a prior art postage evidencing device 10. Display 101 and keypad 102 allow the user to interact with the device. Printer 103 is used to actually create postage indicia on mail pieces. Security module 104 is used to protect the single set of registers in the prior art meters, including ascending register 105 and descending register 106 as well as identifier register 107, which holds an identifier (ID) for postage evidencing device 10.

Figure 2:
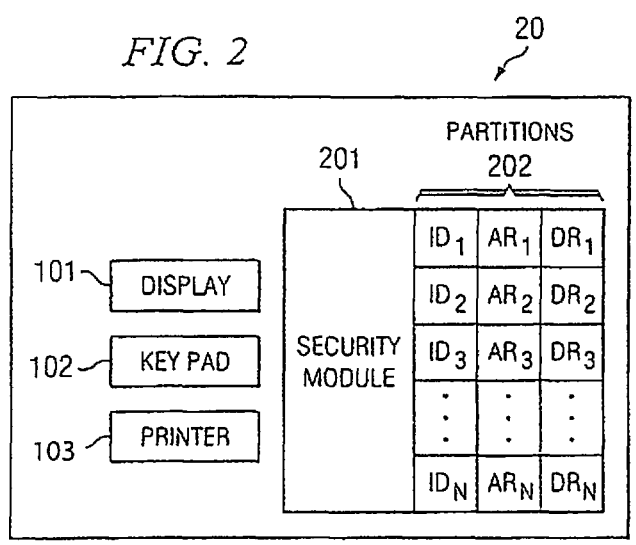
FIG. 2 is a block diagram of a postage evidencing device incorporating embodiments of the present invention.

FIG. 2 is a block diagram of postage evidencing device 20 incorporating embodiments of the present invention. System 20 is a dynamically partitioned postage evidencing device. Elements of system 20 are the similar to the components of postage evidencing devices known in the prior art. Such similar components are labeled in FIG. 2 with the same labels used in FIG. 1. Display 101 and keypad 102 allow the user to interact with the device. Printer 103 is used to create postage indicia on mail pieces.

In system 20, security module 201 protects multiple sets (N sets) of registers 202 instead of single set of registers. Device 20 can be configured to include from one to N sets of registers, each set including an ascending register, a descending register and an ID, labeled, for example, as $AR_N$, $DR_N$, and $ID_N$, respectively. Each of these sets of registers is referred to as a partition herein.

Each partition can be assigned to a separate customer and/or job by the service bureau. Separate and independent amounts of postage or value can be assigned to each partition. When a particular job or customer's mail is processed using device 20, the registers for that job or customer's partition are used to track the amount of postage that is applied to the mail pieces. Device 20 allows a single high-speed mail processing system to be used for multiple jobs, wherein a unique identifier is assigned to each job. As a result, the Postal Service can particularly identify the sender of the mail pieces for each job, thereby preventing the mail pieces from being considered anonymous.

Figure 3:
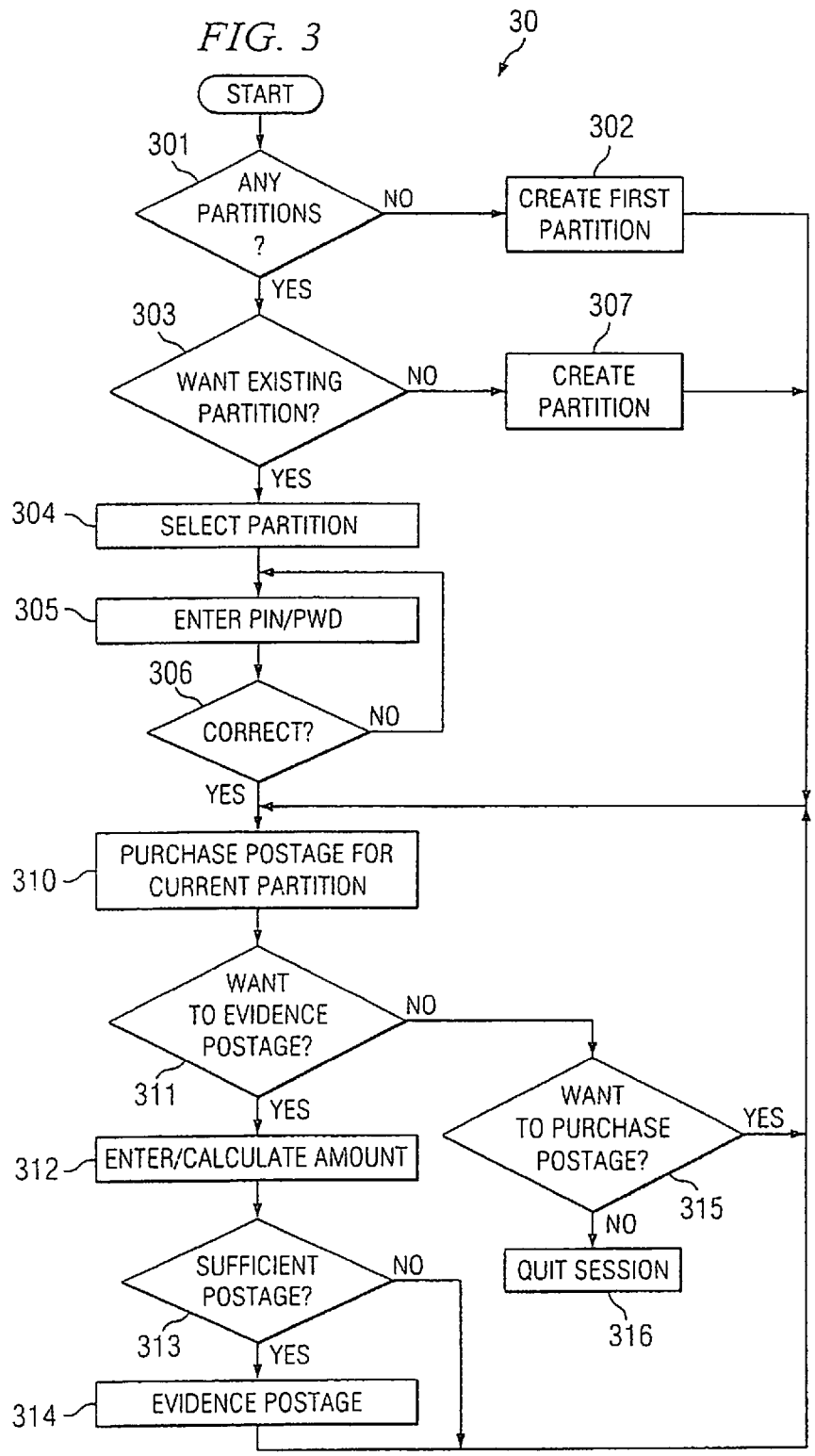
FIG. 3 is a flowchart illustrating a process for using a partitioned postage evidencing device according to embodiments of the present invention.

FIG. 3 is flowchart 30 illustrating a process for using a partitioned postage evidencing device according to embodiments of the present invention. The session begins with a determination at 301 whether any partitions exist. If no partitions exist in the postage evidencing device, then the user is prompted to create a first partition at 302. The process then flows to 310, which will be discussed in more detail below.

Returning to 301, if the postage evidencing device already includes partitions, then the process moves to 303 where the user determines whether he desires to use an existing partition. If the user wants to use a new partition, then the process moves to 307 where the user is prompted to create a new partition. The process then flows to 310 after the new partition is created in the postage evidencing device.

Returning to 303, if the user decides to use an existing partition, then he is prompted to select the desired partition at 304. After selecting the partition, the user is prompted to enter a PIN or password. Decision point 306 determines whether the entered password is correct. If the password is not correct, then the user is taken back to 305 and is prompted to reenter the password. When the correct password is entered and verified at 306, then the process moves to a second start state at 310.

The partition that the user creates or selects at 302, 307 or 304 will be the partition that is used for printing postage for the current run. At start state 310, the user has the option of purchasing initial or additional postage for the selected partition. At 311, the user selects whether to evidence postage. If the user desires to evidence postage, then, at 312, the user enters a postage amount to be evidenced on the mail pieces. Alternatively, at 312, the postage evidencing device calculates the amount of postage that is required for each mail piece.

At 313, the process determines whether sufficient postage value is available. This can be determined, for example, by verifying that the required or requested postage amount is less than the amount available in the descending register for the selected partition. If the available postage is insufficient, then the user is prompted to purchase additional postage at 310. If sufficient postage is available at 313, then the requested or required postage amount is evidenced by printing the postage indicia on the mail piece at 314.

If the user decides not to evidence postage at 311, then the process determines whether the user wants to purchase postage at 315. If the user desires to purchase postage, the process returns to 310 where the user can purchase postage for the selected partition. If the user does not desire to purchase postage at 315, then the session is terminated at 316.

It will be understood by those of skill in the art that the authentication steps at 305 and 306 may be any form of authorization verification now known or later developed and is not limited to the use of a PIN or password. Moreover, in an alternative embodiment, the authentication process and password may be unique for each partition of the postage evidencing device.

Process 30 is particularly useful in the high-speed mail processing environment where a system controller is used to control the printing of postage indicia. In such a system, the controller can select the partition to be used for each job and can enter PIN or identification number to authorize the use of that partition.

When used in a high-speed printing system, the postage amount entered in 312 may be entered directly by the system controller or other device. The postage amount may be the same for an entire run, or may vary depending upon the contents of the individual mail pieces and/or the destination address for the mail pieces.

It will also be understood that the present invention can be used to support multiple sessions simultaneously such that different partitions can perform different tasks at the same time within the device.

Figure 4:
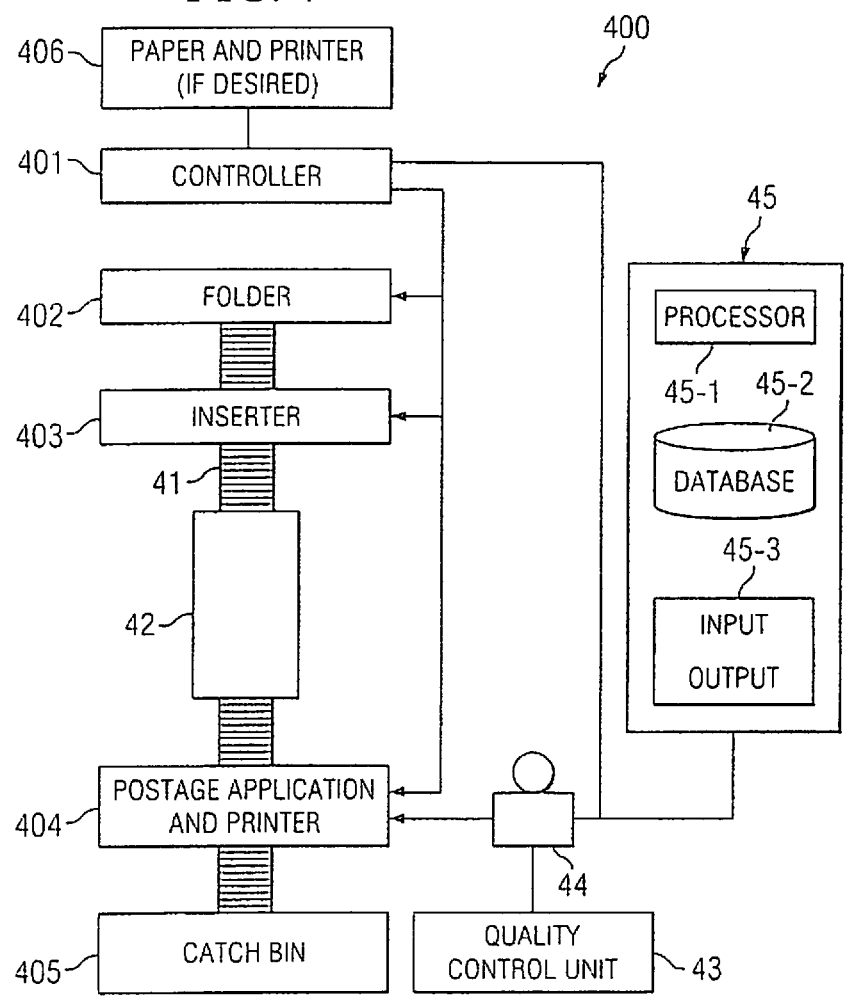
FIG. 4 is a block diagram of an exemplary high-speed mailing system incorporating a partitioned postage evidencing device according to embodiments of the present invention.

FIG. 4 is a block diagram of high-speed mailing system 400 incorporating a partitioned postage evidencing device according to embodiments of the present invention. Controller 401 communicates with folder 402, inserter 403, and postage application printer 404, and controls the processing of the individual mail pieces as they travel through system 400. Controller 401 may be any device now known or later developed for processing digital information and for controlling other devices, such as a microprocessor, Application Specific Integrated Circuit (ASIC), or the like.

Completed mail pieces are stored in catch bin 405. System 400 also includes quality control unit 43 and computer 45, which are coupled to controller 401 and postage computing device 44. Computer 45 includes processor 45-1, database 45-2 and input/output device 45-3. Processor 45-1 may be any device now known or later developed for processing digital information, such as a microprocessor, Application Specific Integrated Circuit (ASIC), or the like. Database 45-2 may be any device capable of storing information in a digital format, such as a Random Access Memory (RAM), a Read Only Memory (ROM), a hard drive, a flash memory, a cache memory, or the like. Input/output device Computer 45 receives work order information for processing various mail pieces. As the work order information is received, computer 45 communicates with controller 401 regarding how to handle each particular mail piece. Using the instructions provided by computer 45, controller 401 directs system 400 to assemble and fold the mail piece in folder 402. The folded mail piece travels down conveyor 41 to inserter 403 where it is inserted into an envelope. Stuffed envelope 42 is transferred down conveyor belt 41 to postage application printer 404. At this point, quality control unit 43 determines if envelope 42 has passed quality checks. For example, quality control unit 43 may ensure that the mail piece was stuffed with the proper number of pages or that the mail piece is of an expected weight. If envelope 42 has passed the quality checks, postage is applied by postage application printer 404.

The printed postage amount is computed in postage computing device 44, which uses information about the individual mail piece from computer 45. System 400 is able to determine the postage due on a piece-by-piece basis. Also, unlike a traditional postage meter, such as meter 404, that can only print a fixed postage amount at any time, postage application printer 404 can print postage for any postal class and for any weight. Accordingly, in system 400, the mail pieces can vary by class and weight and a single production line can be used to process these mail pieces. After the postage is applied by postage application printer 404, the mail piece travels down conveyor belt 41 to catch bin 405 where it is stored in sorted order.

In a preferred embodiment, postage application printer 404 is a high-speed ink jet printer that prints Information-Based Indicia (IBI) on stuffed envelopes 42. Postage application printer 404 may also print other information, such as the destination address. Postage application printer 404 also has the advantage over prior art postage meters of being able to apply the postage in any orientation. Therefore, stuffed envelope 42 can be output from inserter 403 in any orientation. Controller 401 knows the orientation of the envelope as it is produced by inserter 403 and can identify to postage application printer 404 which corner of the envelope is the upper right-hand corner so that the postage is printed in the correct location. In the prior art postage meters, the stuffed envelopes must all be faced and presented in the same orientation so that the meter can stamp the postage in the same area on each envelope, which is typically in the upper right-hand corner.

In one embodiment, computer 45 is a separate device as illustrated in FIG. 4. In other embodiments, computer 45 may be incorporated as part of postage computing device 44 or controller 401, or all three components may be embodied as a single device. Database 45-2 contains information regarding the mail pieces to be processed by system 400. This information includes items such as the address, mail class, folding method, weights of the inserted pages, and the other information to be used for each production job. Computer 45 interacts with controller 401 to control each job. Controller 401 directs folder 402 to combine and fold the mail inserts in the desired manner and directs inserter 403 as to how the envelope should be stuffed. Finally, controller 401 and/or computer 45 provide postage computing device 44 with the weight and class of the mail pieces so that the postage value can be computed. Controller 401 and/or postage computing device 44 then direct postage application printer 404 to print the calculated postage value.

The postage or IBI applied via postage application printer 404 may be different for each mail piece. In system 400, there is no requirement that all of the mail pieces flowing on conveyor 41 have the same postage or be of the same class. Therefore, it is possible to intersperse different types of mail pieces and even to simultaneously process mail pieces from different companies. Each of the mail pieces is tracked by controller 401 and computer 45 so that system 400 tracks the proper postage for each mail piece as it is processed through the system.

In a preferred embodiment, postage computing device 44 is a postage evidencing device according to the present invention and include the partitions or sets of registers that allow the system to be used for multiple customers or jobs. Controller 401 tracks each mail piece and can identify the sender of each mail piece to postage computing device 44, which then calculates the postage amount. Postage computing device 44 selects the partition for the sender and decreases descending registers and increase the ascending register for that partition. Postage computing device 44 directs postage application printer 404 to print the ID for that partition along with the postage indicia. In alternative embodiments, computer 45 or controller 401 act as the postage evidencing device and include the partitions and sets of registers.

Because a unique postage amount and identifier can be applied to each mail piece, system 400 can continuously operate. For example, in one embodiment, printer 406 is stationed ahead of folder 402. Under the control of computer 45, printer 406 prints the mailing material on blank paper from an external source. Computer 45 directs what should be printed by printer 406 and how those sheets should be combined in folder 402 and inserter 403. Then, the proper postage and other information is applied by printer 404. Using the present invention, system 400 can process different jobs from different customers and each job can be marked with an appropriate identification so that the true sender is not anonymous. Also, this allows the service bureau to more accurately track the postage that is used be each job in real-time.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for processing a plurality of mail pieces by a high speed mail processing system, the method comprising:
   continuously analyzing, by a controller in a high speed postage evidencing device, a plurality of printed non-franked mail pieces from a plurality of different senders, wherein the printed non-franked mail pieces were printed prior to the analyzing;
   determining, by the controller, a sender identity of each non-franked mail piece during the continuous analyzing of the plurality of printed non-franked mail pieces;
   identifying, based on the determining, a partition corresponding to the sender identity for each of the plurality of printed non-franked mail pieces, wherein the partition is identified from among a plurality of partitions of a storage device, wherein each of the plurality of partitions comprises a register pair corresponding to a sender identity, each of the register pair comprising an ascending register storing information representative of evidenced postage value, and a descending register storing information representative of available postage value, wherein the plurality of partitions are simultaneously accessible for performing high speed mail processing operations, and wherein each partition of the plurality of partitions has corresponding and unique authentication data;
   providing, by a common security module protecting the plurality of partitions, access to the identified partition; and
   performing postage value accounting for each of the plurality of printed non-franked mail pieces to account for postage indicium data generated for each of the plurality of printed non-franked mail pieces, wherein, for a particular mail piece, the postage value accounting comprises incrementing the ascending register of the identified partition and decrementing the descending register of the identified partition based on a value of postage indicium data generated for the particular mail piece.

2. The method of claim 1, wherein the plurality of printed non-franked mail pieces are not ordered according to the sender identity when the analyzing is performed.

3. The method of claim 1, wherein the continuously analyzing determines the sender identities without ceasing between different senders.

4. The method of claim 1, providing, by the controller, personal identification number (PIN) to the common security module to authorize access to the identified partition for the postage value accounting.

5. The method of claim 1, further comprising:
   tracking, by the controller, each non-franked mail piece as it travels through the high speed mail processing system;
   determining an orientation of each non-franked mail piece as it travels through the high speed mail processing system; and
   identifying, based on the orientation of each non-franked mail piece, a location where postage indicium should be printed for each of the non-franked mail pieces.

6. The method of claim 5, wherein the tracking further comprises performing a quality control check on each of the non-franked mail pieces.

7. The method of claim 1, further comprising processing multiple groups of mail pieces simultaneously within the high speed mail processing system.

8. The method of claim 1, further comprising:
printing a postage indicium on each of the plurality of printed non-franked mail pieces to thereby produce franked mail pieces.

9. The method of claim 8, wherein two or more of the franked mail pieces vary with respect to weight, class, or both.

10. The method of claim 8, wherein the postage indicium comprises a unique identifier corresponding to the sender identity.

11. A high speed mail processing system configured to continuously process a plurality of printed non-franked mail pieces from a plurality of different senders, the high speed mail processing system comprising:
a storage device comprising:
a plurality of partitions, each of the plurality of partitions comprising an identity and a register pair comprising an ascending register storing information representative of evidenced postage value, and a descending register storing information representative of available postage value, wherein the plurality of partitions are simultaneously accessible for performing high speed mail processing operations, and wherein each partition of the plurality of partitions has corresponding and unique authentication data;
a common security module protecting the plurality of partitions,
a controller configured to:
analyze the plurality of printed non-franked mail pieces;
determine, based on the analysis, an identity of a particular sender of the plurality of different senders associated with each mail piece of the plurality of printed non-franked mail pieces; and
select, based on the determined identity, a partition from the plurality of partitions for postage value accounting for each mail piece when processing the plurality of printed non-franked mail pieces, wherein, for a particular mail piece, the postage value accounting comprises incrementing the ascending register of the selected partition and decrementing the descending register of the selected partition based on a value of postage indicium data generated for the particular mail piece; and
a printer configured to print a postage indicium on each mail piece.

12. The high speed mail processing system of claim 11, wherein the plurality of printed non-franked mail pieces are not ordered according to senders of the plurality of different senders.

13. The high speed mail processing system of claim 11, wherein the controller is further configured to continuously determine each particular sender without ceasing between different senders in the plurality of senders.

14. The high speed mail processing system of claim 11, wherein the controller is configured to process multiple groups of plurality of mail pieces simultaneously within the high speed mail processing system.

15. The high speed mail processing system of claim 11, wherein the controller is further configured to determine the value of the postage indicium evidenced for the particular mail piece.

16. The high speed mail processing system of claim 11, wherein the controller is further configured to provide personal identification number (PIN) information to the common security module to authorize access to the selected partition for the postage value accounting.

17. The high speed mail processing system of claim 11, wherein the controller is further configured to track each mail piece as it travels through the high speed mail processing system.

18. The high speed mail processing system of claim 17, wherein the tracking comprises knowing an orientation of the mail piece and identifying which portion of the mail piece the postage indicium should be printed.

19. The high speed mail processing system of claim 17, wherein the tracking comprises knowing a location of each of the mail pieces as they travel through the high speed mail processing system.

20. A non-transitory computer-readable storage medium storing instructions that, when executed by one or more processors, cause the one or more processors to perform operations for processing a plurality of mail pieces through a high speed mail processing system, the operations comprising:
continuously analyzing, by a controller in a high speed postage evidencing device, a plurality of printed non-franked mail pieces from a plurality of different senders, wherein the printed non-franked mail pieces were printed prior to the analyzing;
determining, by the controller, a sender identity of each non-franked mail piece during the continuous analyzing of the plurality of printed non-franked mail pieces;
identifying, based on the determining, a partition corresponding to the sender identity for each of the plurality of printed non-franked mail pieces, wherein the partition is identified from among a plurality of partitions of a storage device, wherein each of the plurality of partitions comprises a register pair corresponding to a sender identity, each of the register pair comprising an ascending register storing information representative of evidenced postage value, and a descending register storing information representative of available postage value, wherein the plurality of partitions are simultaneously accessible for performing high speed mail processing operations, and wherein each partition of the plurality of partitions has corresponding and unique authentication data;
providing, by a common security module protecting the plurality of partitions, access to the identified partition; and
performing postage value accounting for each of the plurality of printed non-franked mail pieces to account for postage indicium data generated for each of the plurality of printed non-franked mail pieces, wherein, for a particular mail piece, the postage value accounting comprises incrementing the ascending register of the identified partition and decrementing the descending register of the identified partition based on a value of postage indicium data generated for the particular mail piece.

* * * * *